United States Patent
White et al.

(10) Patent No.: US 10,938,951 B2
(45) Date of Patent: Mar. 2, 2021

(54) CONTENT CENTRIC MESSAGE FORWARDING

(71) Applicant: Cable Television Laboratories, Inc., Louisville, CO (US)

(72) Inventors: Gregory C. White, Louisville, CO (US); Robert M. Lund, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 10 days.

(21) Appl. No.: 16/133,499

(22) Filed: Sep. 17, 2018

(65) Prior Publication Data

US 2019/0089811 A1 Mar. 21, 2019

Related U.S. Application Data

(60) Provisional application No. 62/558,941, filed on Sep. 15, 2017.

(51) Int. Cl.
| | |
|---|---|
| *G06F 15/173* | (2006.01) |
| *H04L 29/08* | (2006.01) |
| *H04L 12/721* | (2013.01) |
| *H04L 12/741* | (2013.01) |
| *H04L 12/761* | (2013.01) |
| *H04L 12/751* | (2013.01) |

(52) U.S. Cl.
CPC ............ *H04L 67/327* (2013.01); *H04L 45/16* (2013.01); *H04L 45/34* (2013.01); *H04L 45/745* (2013.01); *H04L 45/02* (2013.01)

(58) Field of Classification Search
CPC ..... H04L 67/327; H04L 45/34; H04L 45/745; H04L 45/16; H04L 45/02
See application file for complete search history.

(56) References Cited

U.S. PATENT DOCUMENTS

| | | | |
|---|---|---|---|
| 2013/0251031 A1 | 9/2013 | Yitschak | |
| 2015/0032892 A1* | 1/2015 | Narayanan | H04L 47/70 709/226 |
| 2016/0142510 A1 | 5/2016 | Westphal | |
| 2016/0234110 A1* | 8/2016 | Garcia-Luna-Aceves | H04L 45/74 |
| 2017/0134276 A1* | 5/2017 | White | H04L 67/327 |
| 2017/0150165 A1 | 5/2017 | Na | |
| 2018/0091821 A1 | 3/2018 | Jeon | |
| 2018/0131673 A1* | 5/2018 | White | H04L 67/2842 |
| 2018/0302323 A1* | 10/2018 | Moiseenko | H04L 45/745 |

* cited by examiner

*Primary Examiner* — Richard G Keehn
(74) *Attorney, Agent, or Firm* — Great Lakes Intellectual Property, PLLC (57) ABSTRACT

Message forwarding over a network is contemplated. The contemplated forwarding may facilitate message communications without requiring stateful storage of attendant information at forwarding nodes, such as to facilitate stateless message forwarding carried over networks using names or other non-address related fields to facilitate Information Centric Networking (ICN), Content Centric Networking (CCN) and/or Named Data Networking (NDN).

16 Claims, 5 Drawing Sheets

CONTENT CENTRIC MESSAGE FORWARDING

CROSS-REFERENCE TO RELATED APPLICATIONS

This application claims the benefit of U.S. provisional application No. 62/558,941 filed Sep. 15, 2017, the disclosure of which is incorporated in its entirety by reference herein.

TECHNICAL FIELD

The present invention relates to message forwarding over a network, such as but not necessarily limited to message forwarding over a network using content-centric naming for message routing.

BACKGROUND

Information Centric Networking (ICN) is an emerging networking approach that aims to compensate for many of the shortcomings inherent in the Internet Protocol (IP), particularly in current networks and in the networks envisioned in the future. One specific approach to Information Centric Networking, also known as Content Centric Networking (CCN) and/or Named Data Networking (NDN), appears to be gaining mindshare in the research community and in industry, and promises to significantly improve network scalability, performance, and reduce cost over a network built on the IP. CCN/NDN provides native and elegant support for client mobility, multipath connectivity, multicast delivery and in-network caching; many of which are critical for current and future networks, and all of which require inefficient and/or complex managed overlays when implemented in IP. Further, CCN/NDN may provide a much richer addressing framework than that existing in IP, which could eliminate significant sources of routing complexity. CCN, NDN or other such IP-less communication methodologies may rely upon an interest and content object messaging strategy whereby interests are communicated from one node to another within the network to request desired content whereby a producer/node having the desired content responsively provides the content within a content object. The node responsively transmitting a content object having the desired content can utilize naming included in the interest to facilitate routing the content object through the network back to the requester/consumer. The reliance on message naming to facilitate routing/forwarding messaging may require the nodes, routers or other entities tasked with forwarding to maintain state for the forwarded messaging in order to facilitate subsequent return of the related content object. The nodes may utilize a Pending Interest Table (PIT) or other memory construct to facilitate statefully storing the naming information needed to facilitate routing messaging through the network. The PIT may track the names or other textual fields used to register messages being forwarded over the network, which necessarily requires the nodes to each individually perform a number of read/write operations to memories having sufficient bandwidth to maintain all the state necessary to facilitate message forwarding.

The amount of CPU processing, memory and memory bandwidth attendant to statefully maintaining the naming information can degrade performance, increase costs and be inefficient to message forwarding. One non-limiting aspect of the present invention contemplates ameliorating consumption of CPU processing, memory, memory bandwidth and/or other resources attendant to statefully maintaining naming information to improve network operation through diminished reliance on stateful storage of naming or other information utilized to facilitate message routing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
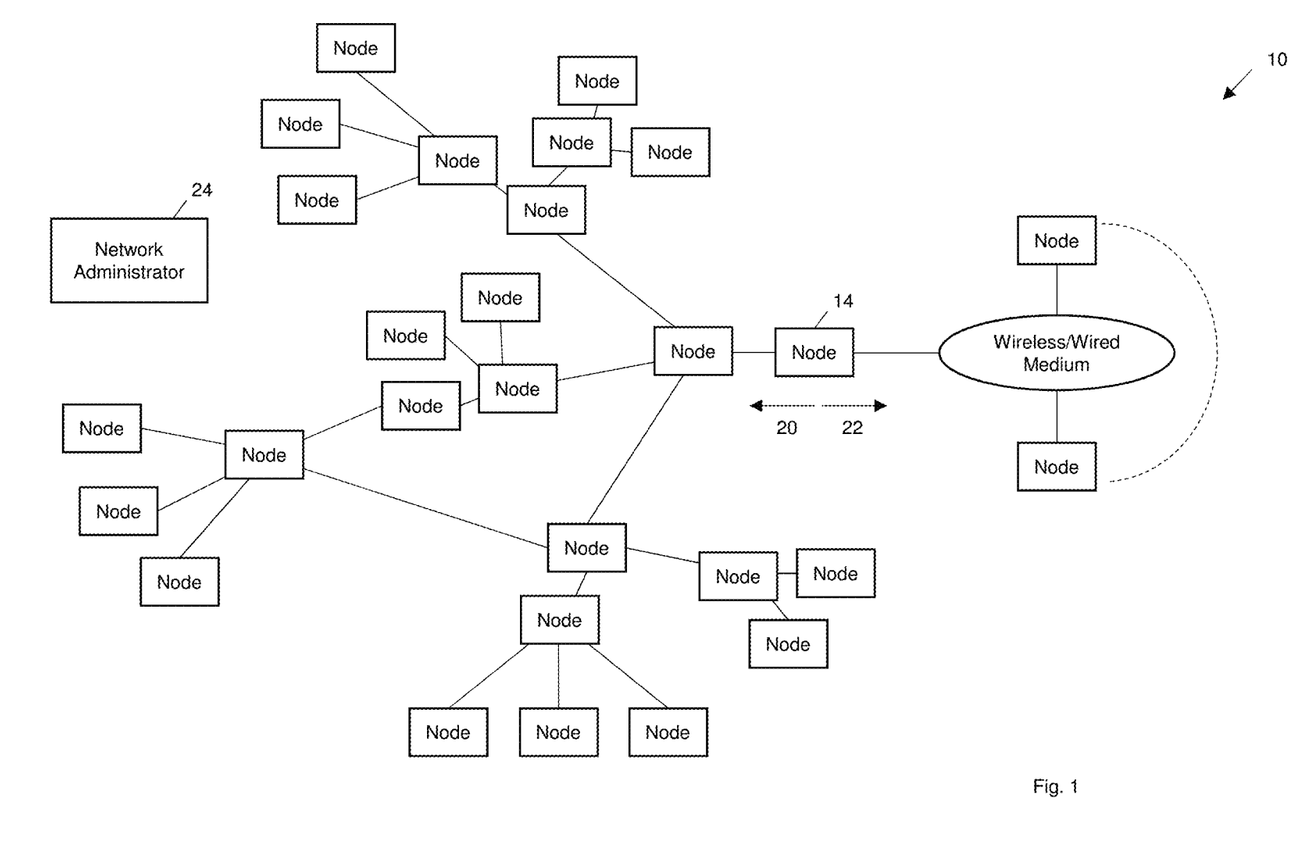
FIG. 1 illustrates a network in accordance with one non-limiting aspect of the present invention.

FIG. 1 illustrates a network 10 in accordance with one non-limiting aspect of the present invention. The network 10 may be configured to operate according to any suitable response and request protocol whereby content, data, objects, files, information, signaling, messages, etc. may be routed according to locally and/or globally unique names associated therewith. The network 10 may facilitate message routing according to the above-described Name Data Networking (NDN) or Information Centric Networking (ICN) and is predominately described for exemplary non-limiting purposes with respect to being operational according to Content Centric Network (CCN) principles. The network may be configured to operate in a manner commensurate with the processes, messaging and other operations described within CCNx Semantics (draft-irtf-icnrg-ccnxsemantics-09) as published by The Internet Engineering Task Force (IETF), Jun. 27, 2018, and/or CCN 1.0 Protocol Architecture as published by Marc Mosko, Ignacio Solis, Ersin Uzun of the Palo Alto Research Center, the disclosures of which are hereby incorporated by reference in their entireties herein. The network 10 is shown to include a plurality of nodes configured to facilitate forwarding messages for clients (not shown) connected thereto or otherwise associated therewith, e.g., each node may be configured to facilitate routing, forwarding, relaying, processing or otherwise exchanging upstream and downstream signaling for one or more clients associated therewith.

The network 10 is shown to include a wired, wireless and/or combined wireless and wired medium to facilitate communications between a plurality of nodes. A boundary node 14 may be positioned so as to have a plurality of nodes connected downstream therefrom in. The node 14 may be characterized as an edge or boundary node as all signaling between nodes connected downstream therefrom, which may be referred to as interior nodes 20, and nodes connected upstream therefrom, which may be referred to as exterior nodes 22, must pass through the boundary node 14. The illustrated interconnection of nodes is shown for exemplary, non-limiting purposes as the network 10 may employ any number of wired and/or wireless connections between the nodes and is shown for purposes of the boundary node 14 exemplarily demarcating a managed or autonomous portion/network from an unmanaged or non-autonomous portion/network. The managed network may be associated with a particular Internet Service Provider (ISP) under the control or instruction of a network administrator 24 and the unmanaged network may be associated with the Internet and various ISPs associated therewith. The administrator 24 may be included to facilitate managing or otherwise controlling communications over the managed network, such as to facilitate an implementation of the process and operations contemplated herein to diminish reliance on stateful storage of information utilized to facilitate message routing.

The contemplated CCN/NDN technology may utilize any number of packet types and is predominantly described with respect to use of an "interest" packet and a "data" packet (while both CCN/NDN use the term "interest", CCN refers to the data packet as a "content object"). The present invention references a request for a piece of content to occur with issuance of an interest and a response thereto, i.e., delivery of the requested piece of content, to occur with issuance of a content object for non-limiting purposes as the present invention fully contemplates its use and application with other types of protocols, messaging or nomenclatures. One non-limiting aspect of the present invention contemplates message forwarding according to non-IP addressing or other protocols requiring a connection or identification of a source/destination associated with the corresponding message, packet, etc. in favor of the content-centric naming. An interest may be used to identify the resource, e.g., piece of content, that is being requested, which may be identified by a name that includes provenance whereby, in some cases, the name uniquely (in a global sense) may identify a specific content object, and in other cases it may contain wildcards that indicate that any of a set of content objects that could satisfy the request.

When a client or another device (not shown) connected to one of the nodes launches an interest (packet, message, etc.) into the network 10, it expects a corresponding content object in response. Notably, the interest may not identify the client (sender) in any way and it may include other fields to refine the request in certain ways. NDN provides several "selectors" for this purpose and CCN includes two additional optional fields: a content object hash and a KeyID. A content object may include the name of the resource, piece of content, etc. included therein. One principal is that a content object is a uniquely named resource chunk. It could be an entire resource, or a small fragment of one, but in either case, it is uniquely identified by a name field. In addition to the name field and the resource itself, the content object may contain either a hash or a digital signature that can be used by a recipient to verify provenance. In the case of NDN, each content object may be required to contain a digital signature along with an identifier of the signing key, which allows the packet to be validated by any node in the network. CCN introduces the possibility of using a content object hash, which can be used along with other information to establish provenance as will be described further below.

Structuring names for data objects is an open area of research in the ICN space. In particular, whether names are hierarchical or flat is an area of debate, with pros and cons identified for both approaches. In CCN/NDN names are composed of an arbitrary-length prefix (which is hierarchical) followed by a portion that may or may not be hierarchical. CCN/NDN names commonly resemble a URL, e.g., cablelabs.com/specs/main.html, however the resemblance is largely superficial, because the first element is not intended to be a DNS resolvable name, and a name may not be required to be human-readable. The use of a hierarchical prefix allows for route aggregation in intermediate routers, which is intended to simplify routing. The CCN/NDN architecture may include a trust model for validating packet signatures. Every device that is capable of acting as a source of information (which is practically every networked device) may need one or more certificates to authenticate its content to others, as well as to announce itself to the network as an authoritative source. Developing a trusted means to distribute the certificates, and to establish and convey trust in them is still being researched.

While the purpose of a node (router) in CCN/NDN is largely the same as a router in the world of IP, i.e., moving packets closer to the intended recipient, the functions of a node in CCN/NDN differ considerably from those of an IP router. A CCN/NDN node may consist of a set of faces. The term "face" is used as a more general replacement for "interface", since it not only includes the physical and logical interfaces, but also the applications that reside on the node. To manage packet forwarding, the node in conventional systems maintains three data structures: a Pending Interest Table (PIT); a Forwarding Information Base (FIB) and a Content Store (CS). When an Interest arrives on a particular face, the node first checks the Content Store (CS) to see if a matching content object is already present in cache. If so, it immediately sends a copy of the content object to the face on which the corresponding Interest arrived, optionally without altering the content object in any way. Since addressing is not included in the content object, there is no need to prepend this information, and since each content object is uniquely named and digitally signed by its origin, it makes no difference to the client whether the content object was delivered by an intermediary or came directly from the origin.

If a matching Data packet does not exist in cache (CS), the node checks to see if a matching entry already exists in the Pending Interest Table (PIT). If a matching entry already exists in the PIT, the node simply adds the face to the existing PIT entry and optionally discards the Interest. If a match is not found, the node creates a new entry (including the face on which the Interest arrived), and then forwards the Interest out one or more faces based on the content of the FIB (the corollary to the routing table or FIB in an IP router). The FIB may be configured to map name prefixes to faces and to use a longest match approach (conceptually similar to IP routing) to find the appropriate FIB entry for a particular interest. As noted above, the FIB entry can identify multiple faces on which the interest could be forwarded. Making decisions about which face to use in this situation is a function of a "strategy" layer within the node. The strategy could deterministically select a face based on history of response times, link cost, or other criteria. Alternatively, it could stochastically select a face, perhaps weighting its selection based on these criteria, in order to load-balance traffic to multiple content sources. The strategy layer is allowed to send the interest out multiple faces. While this "fanning out" of interests is not expected to be used frequently (lest the network be overcome with proliferating interests), it could enable the network to quickly locate the nearest copy of a content object, as well as to move the interest closer to the content origin in the absence of a converged routing topology.

When a content object arrives on a particular face, the node checks its PIT to see if any faces have requested the packet. If so, it forwards a copy of the content object to the indicated face(s), deletes the PIT entry, and optionally stores the content object in the content store. Thus, when an interest is launched into the network by a client, it may traverse several intermediate nodes, and potentially be fanned out in different directions. At each intermediate node, a PIT entry is created identifying, for that node, which direction to send the corresponding content object when it arrives. Once a node identifies that it has the content object in its content store or can respond to the interest itself (via a resident application), the content object follows the breadcrumb trail of PIT entries created by the interest back to the client that initiated it. Every node in the network can check the digital signature of each content object and discard any invalid packets. In general, the end client would be expected to perform this validation, as would any intermediate node that caches the content object. In CCN, if the content object has a Content Object Hash, each node is required to validate the hash and discard the packet if it does not validate.

Figure 2:
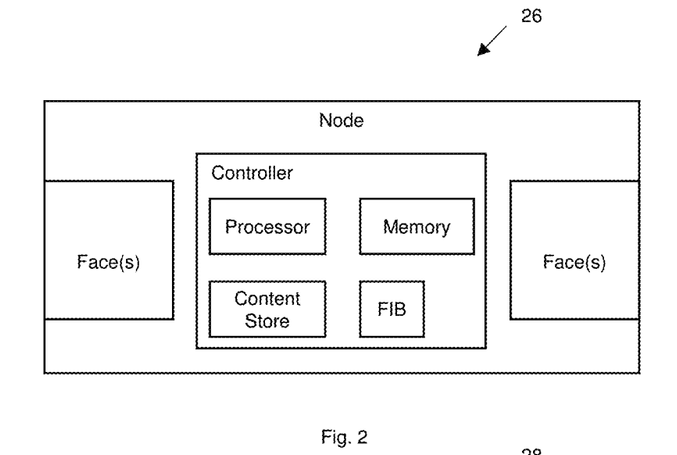
FIG. 2 illustrates an interior node in accordance with one non-limiting aspect of the present invention.

FIG. 2 illustrates an interior node 26 in accordance with one non-limiting aspect of the present invention. The interior node 26 may differentiate from the nodes used in the described conventional CCN in that it omits use of the PIT and its attendant memory and consumption of CPU processing to maintain stateful information associated with message forwarding. The interior node 26 is predominately described as a standalone entity configured to facilitate forwarding, routing or other signaling between upstream and downstream faces capable of interacting with wired and/or wireless communication mediums. The node 26 is intended to generally refer to any entity distributed in a networked environment capable of operating in accordance with the described architectures, protocols and messaging associated with content/name/information centric networking, e.g., capable of facilitating non-IP-based communications. (The node 26 may be configured to also support optionally IP-based indications, such as in the manner described in U.S. application Ser. No. 15/615,022, entitled Internet Protocol over a Content-Centric Network (IPOC), the disclosure of which is hereby incorporated by reference in its entirety herein). The node 26 may include a controller for controlling the operation thereof being provided with a processor configured to facilitate executing non-transitory instructions stored within a non-transitory computer-readable medium, such as to facilitate the operations contemplated by the present invention. The content store and FIB are shown for exemplary purposes as being separate from the memory in order to pictorially note the operations and processes described above and associated therewith.

Figure 3:
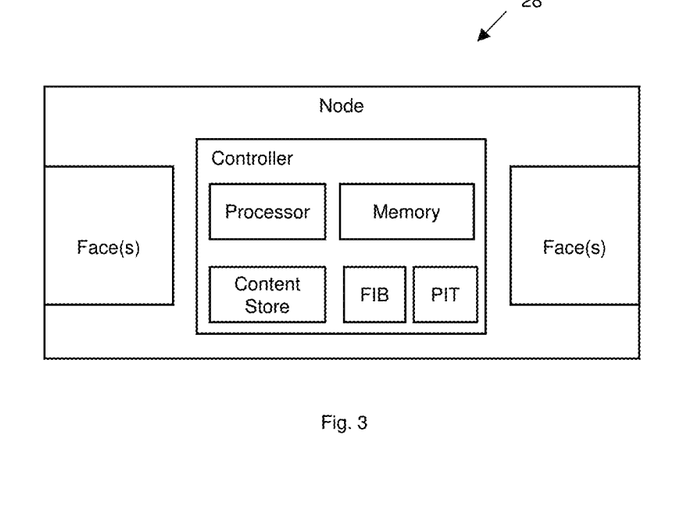
FIG. 3 illustrates a boundary node in accordance with one non-limiting aspect of the present invention.

FIG. 3 illustrates a boundary node 28 in accordance with one non-limiting aspect of the present invention. The boundary node may be similar to and include features and processes to facilitate the operations associated with the interior node 26 and differentiated by including the PIT omitted from the interior node 26. One non-limiting aspect of the present invention contemplates a forwarding strategy whereby the stateful information typically stored in the PIT is forgone in favor of utilizing a face stack (FS) strategy whereby face labels, identifications (IDs) and/or other values are instead appended to interest and content object to facilitate routing messaging through the managed network in a manner sufficient to eliminate the need for the interior nodes 26 to statefully store the information conventionally stored in the PIT. The boundary node 28 is shown to include the PIT in order to demonstrate one non-limiting aspect of the present invention whereby the exterior nodes 28 associated with the unmanaged network of the CCN are unable to or otherwise prevented from using the FS strategy to facilitate message forwarding, i.e., a scenario where the boundary node 26 is required to maintain PIT-related state in order to facilitate interactions with additional nodes.

The PIT may be a logical construct, i.e., one having operations and processes existing in software or otherwise performed by an attendant processor executing non-transitory, computer-readable instructions stored within the memory, such that the interior nodes 26 and the exterior nodes 28 may include the same and/or equivalent hardware, circuitry, etc. with the interior nodes 26 optionally being differentiated from the exterior nodes 28 in so far as its memory and/or processor lacking the instructions necessary to facilitate execution of the operations required for implementation of the PIT and its related consumption of resources and/or the attendant instructions and capabilities being present but turned off or otherwise prevented from being implemented, such as according to instructions provided by the network administrator 24 utilized to facilitate coordinating operations of the managed network. The exemplary depictions of the interior and exterior nodes 26, 28 are for exemplary non-limiting purposes as the present invention fully contemplates the interior and/or exterior nodes 26, 28 having any number of configurations sufficient to facilitate the operations contemplated herein to diminish reliance on stateful storage of information for message forwarding.

Figure 4:
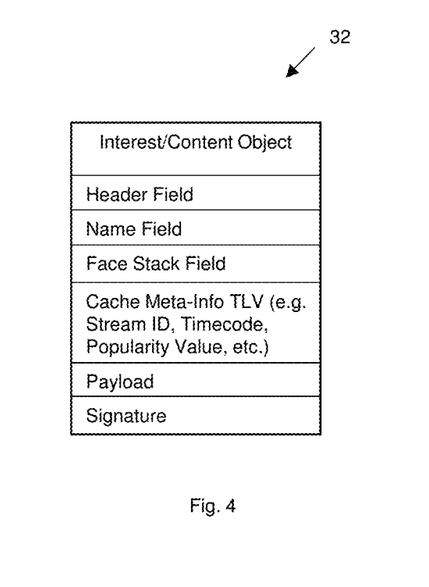
FIG. 4 illustrates a message/packet in accordance with one non-limiting aspect of the present invention.

FIG. 4 illustrates a message/packet 32 that may be utilized as interest/content object in accordance with one non-limiting aspect of the present invention. The message 32 may be may be characterized as a message type utilized within the network 10 to facilitate delivering a request for (interest) and/or a piece of content (content object) to/from a consumer/producer. Forwarding of the message 32 may be facilitated with a header having fixed and/or optional fields as defined according to certain protocols to facilitate content-centric networking or version identification and other communication parameters. The name associated with the piece of content included within the message may be identified within a name field as a globally unique name, i.e., unique across all networks, or locally unique or unique over the communication range of the CCN. A cache meta-info type-length-value (TLV) field may include a stream identity (ID), a timecode, a popularity value and/or additional information regarding the message and/or the piece of content included within a payload. The message 32 may include a signature that a recipient can use to verify provenance of the content object and/or the piece of content therein, such as with the use of certificates or other digital authorization techniques. A face stack field is shown to be included to facilitate tracking face labels appended and/or de-appending to the message/packet 32 in accordance with the contemplated FS strategy. The face stack field may be a standalone field or a reserved field within the message/packet 32 and/or it may be otherwise associated with each message/packet 32 to facilitate the operations contemplated herein.

Figure 5:
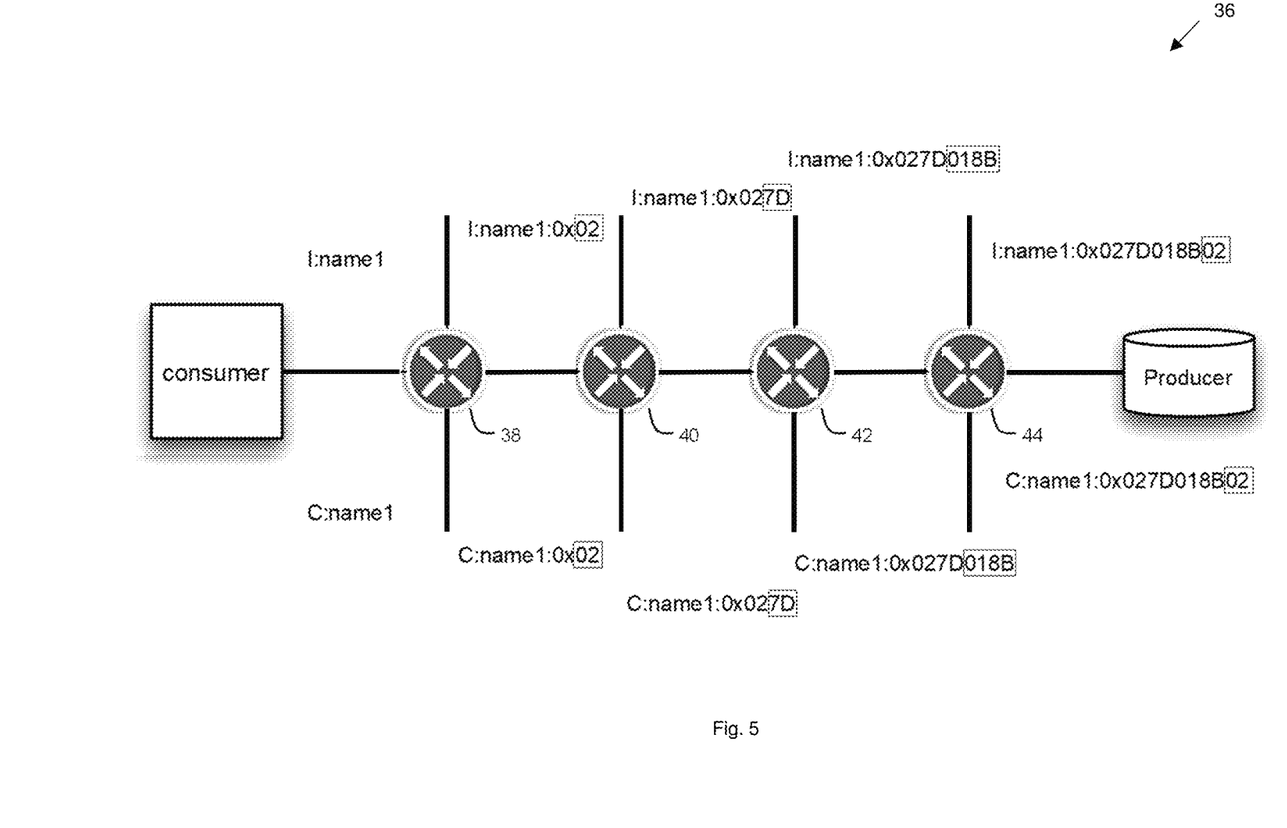
FIG. 5 illustrates a diagram of message forwarding in accordance with one non-limiting aspect of the present invention.

FIG. 5 illustrates a diagram 36 of message forwarding in accordance with one non-limiting aspect of the present invention. The contemplated messaging forwarding is described for exemplary non-limiting purposes with respect to facilitating forwarding of interests and content objects associated with CCN-based communications. Use of the contemplated forwarding may not necessarily be limited to CCN-based systems and is suitable to facilitating other message forwarding of the type whereby, instead of forwarding state existing in local memory in a PIT in each forwarder, the state may be accumulated in the interest and transferred to the content object by a producer or a forwarder near the producer and stripped off enroute back to a consumer. A top portion of the diagram illustrates an interest (I) originating at a consumer, e.g., a device connected to one of the nodes, being forwarded by multiple nodes until a node associated with a producer having the desired content is reached. A bottom portion of the diagram illustrates a content object (C) originating at the producer being forwarded by multiple nodes until the node associated with consumer is reached whereupon the desired content included in the payload thereof is obtained by the consumer. The diagram illustrates the contemplated FS strategy whereby the state and/or other information needed by the nodes to facilitate forwarding the interest and content object may be included within the corresponding message/packets instead of being stored locally at each of the nodes.

The diagram 36 illustrates the consumer originating the interest with specificity of in the name field of the desired content of "name1", i.e., representing "name1" within the name field of the interest in a content-centric manner. A first router 38 may begin forwarding the interest to a second router 40 in an attempt to seek the corresponding content object, optionally after assessing the interest to determine its content store lacking a content object associated with "name1". The first router 38 may instantiate implementation of the FS strategy contemplated herein whereby a face label may be added to the interest before forwarding the interest to a second router 40 to designate the face on the first router 38 receiving the interest. The face label being added to the interest may be appended to a face stack field of the interest, such as by appending the information to the arriving interest to designate a face on the first router 38 receiving the interest, which is shown for exemplary purposes to correspond with an exemplary, hexadecimal representation of "0x02". The process of appending a face label associated with the face receiving the interest before forwarding the interest to a next node may be repeated at each node 40, 42, 44 with each appending its face label to the interest. The diagram illustrates the second node 40 appending its receiving face label of "7D" to the prior interest (0x02), a third node 42 appending its receiving face label of "018B" to the prior interest (0x027D) and a fourth node 44 appending its receiving face label of "02" to the prior interest (027D018B).

The face stack field of the interest after arrival at the producer, following appending of the face labels at each node 38, 40, 42, 44 between it and the consumer, may be correspondingly represented as "027D018B02". The face stack field within the interest at the time of arrival at the producer may correspondingly include sufficient stateful representations/values to indicate each face of the forwarding routers 38, 40, 42, 44 utilized to facilitate forwarding the interests in a manner sufficient to generate a "breadcrumb trail" or other routing methodology to enable return of the corresponding content object to the consumer. This methodology for appending information to the face stack field at the time of each router forwarding an interest may be considered as a FS strategy in so far as the face labels associated with the receiving face of each node are stacked upon each other until the corresponding interests reaches a consumer having the requested content. The producer may in turn generate a corresponding content object having the face stack field with each of the stacked/appended face labels, i.e., "027D018B02". The fourth router 44 receiving the corresponding content object may then determine the appropriate face to be used in forwarding the content object to the next node (third node 42) as the face associated with the face label it previously added to the content object.

The fourth node 44 may de-append or otherwise remove the appended face label it previously appended to the face stack field before forwarding the content object to the third node 42. The remaining nodes 38, 40 may similarly de-append the face label each previously added to the face stack field before forwarding the corresponding content object to the next node or the consumer such that when the content object arrives at the consumer it includes an empty face stack field. By including the stateful information needed by each node 38, 40, 42, 44 in the forwarding chain to identify the appropriate face or other information needed to facilitate forwarding the corresponding message to the appropriate node, one non-limiting aspect of the present invention is able to diminish and/or entirely eliminate the need for the PIT as the stateful information conventionally stored therein is unnecessary in light of each node including capabilities sufficient to identify the face needed for forwarding content objects solely from the face labels included in the face stack field, i.e., the face labels previously appended/stacked to the face stack field as the interest traversed the CCN network.

The described FS strategy indicates an implementation whereby each node de-appends face labels it previously added to an interest prior to forwarding the resulting content object. Such a strategy may be facilitated with the network administrator 24 distributing a protocol for designating face label representations and/or the nodes individually implementing a naming strategy. One naming strategy may include requiring each node to specify its faces according to an equal or a fixed number of bytes (n) each time it forwards an interest so that it knows to de-append that number of bytes from the ending of the face stack field before forwarding the content object. The manner utilized by each node to uniquely differentiate its faces, i.e., to assign a unique face label to each available face, utilizing the allotted n bytes need not be communicated from node to node or shared with the network administrator 24 since the sharing thereof would be unnecessary as long as each node is aware of the number of bytes it should individually de-append or remove from the face stack field prior to forwarding. The third node 42 is illustrative of the capability of the present invention to permit each node to individually assign face labels without communicating the methodology to the other nodes whereby the third node 42 utilizes two times the hexadecimal values for the appended face label in comparison to the other nodes.

The ability of the present invention to facilitate appending face labels to interests and de-appending face labels from content objects without requiring coordination of the naming strategy employed at each node with the network administrator 24 and/or the other nodes may be beneficial in ameliorating complexities of the FS strategy. The present invention is not necessarily so limited and fully contemplates its use and application in appending and de-appending information/values to interest and content objects according to a coordinated strategy whereby the network administrator 24 and/or the nodes interact to ascertain the face label naming strategies being individually employed thereat, i.e., what values the nodes are to associate with each face to facilitate the appending and de-appending thereof. The present invention also fully contemplates forwarding the content object without having to de-append the previously added face label and/or to otherwise manipulate or remove/add information to the face stack field of the content object, which may be beneficial in further diminishing processing and/or other operations being performed at the forwarding nodes. Such a process may be facilitated by the nodes including capabilities sufficient to identify the face label it previously appended to the face stack field and/or capabilities sufficient to derive from the face stack field the face it received the corresponding interests, e.g., an algorithm, table or other process may be utilized to facilitate identifying the appropriate face from value/representations included within the face stack field of the content object.

Figure 6:
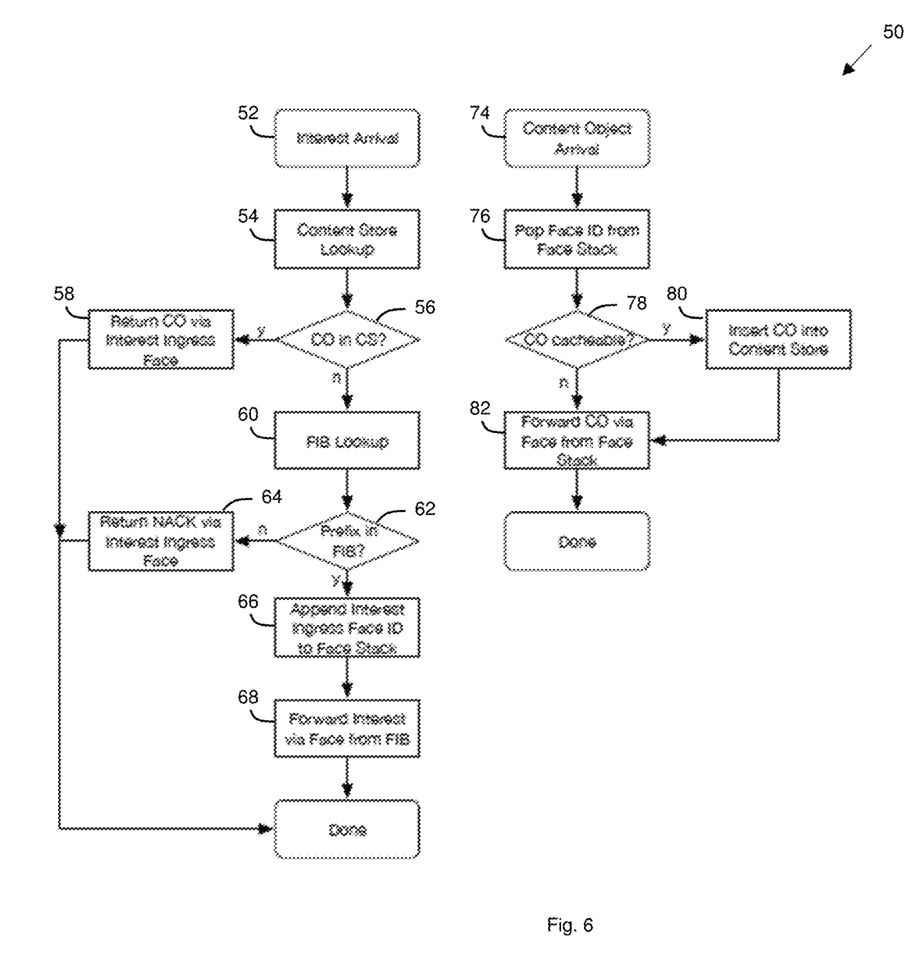
FIG. 6 illustrates a flowchart of a method for forwarding in accordance with one non-limiting aspect of the present invention.

FIG. 6 illustrates a flowchart 50 of a method for forwarding in accordance with one non-limiting aspect of the present invention. The flowchart describes processes associated with operation of an interior node, i.e., a node operating without a need to forward packets to other nodes outside of the managed network and/or incapable of implementing the FS strategy for utilizing stateful information included within the messaging to facilitate forwarding instead of requiring nodes, routers or other entities performing the forwarding to statefully store corresponding information. The operations and processes associated with the method may be facilitated with the non-transitory instructions stored within the controller of each node and/or through a remote controller or other device operating independently of the nodes having capabilities sufficient or capable of monitoring and providing the corresponding instructions/commands to the nodes needed to facilitate executing the operations described herein. The flowchart 50 depicts operation of a node when forwarding interests and corresponding operations when forwarding a resulting content object, which may be simultaneously performed at each node and/or according to other processes and operations without deviating from scope contemplation of the present invention.

Block 52 relates to an interest arriving at an interior node. Blocks 54-56 relate to the node determining whether its content store (CS) includes and content object (CO) matching that requested in the interest. Block 58 relates to the node responding with a related content object through the face receiving the interest determining when it has a CO matching that requested in the interest. Blocks 60-62 relate to the node determining it lacks a matching CO and performing an assessment of the FIB to determine whether the interest can be forwarded therefrom. Block 64 relates to the node issuing a NACK to the consumer indicating an inability to forward the interest. Blocks 66-68 relates to the node appending the face label of the face receiving the interest before forwarding it to a next node according to the routing indicated in the FIB. Each node needed to facilitate forwarding interest until the interest reaches a node having a suitable content object similarly performing the foregoing operations to facilitate appending/adding multiple face labels to the interest as the interest traverses through the network so as to create a FS strategy whereby face labels are stacked upon each other. One non-limiting aspect of the present invention contemplates appending the face labels in the foregoing manner without correspondingly storing stateful information at the nodes, i.e., without use of a PIT and/or without adding or subtracting entries made to a table or other memory construct kept at each node to track interest passing therethrough.

Block 74 relates to a node receiving a content object having the content matching that identified in the interest. Block 76 relates to the node de-appending or otherwise removing the face label it previously appended to the interest, such as removing the last n bytes included in the face stack field. Blocks 78-82 relates to the node determining whether the content object should be cached in its CS before forwarding to a next node, such as in the manner described in U.S. application Ser. No. 15/345,333, entitled Preemptive Caching of Content in a Content-Centric Network, the disclosure of which is hereby incorporated by reference in its entirety herein. The removal of the face label in Block 76 from the face stack field or other portion of the content object may be performed in order to enable the next node to similarly remove the n bytes it previously appended to the corresponding interests. This process may be repeated for each node until the content object reaches the consumer such that the face stack field in the content object at the consumer is empty. The foregoing FS strategy for forwarding the content object may be performed without requiring the nodes to delete entries or otherwise interact with the PIT or other stateful storage elements to track passage of the content objects therethrough, the diminishing CPU processing and memory demands.

Figure 7:
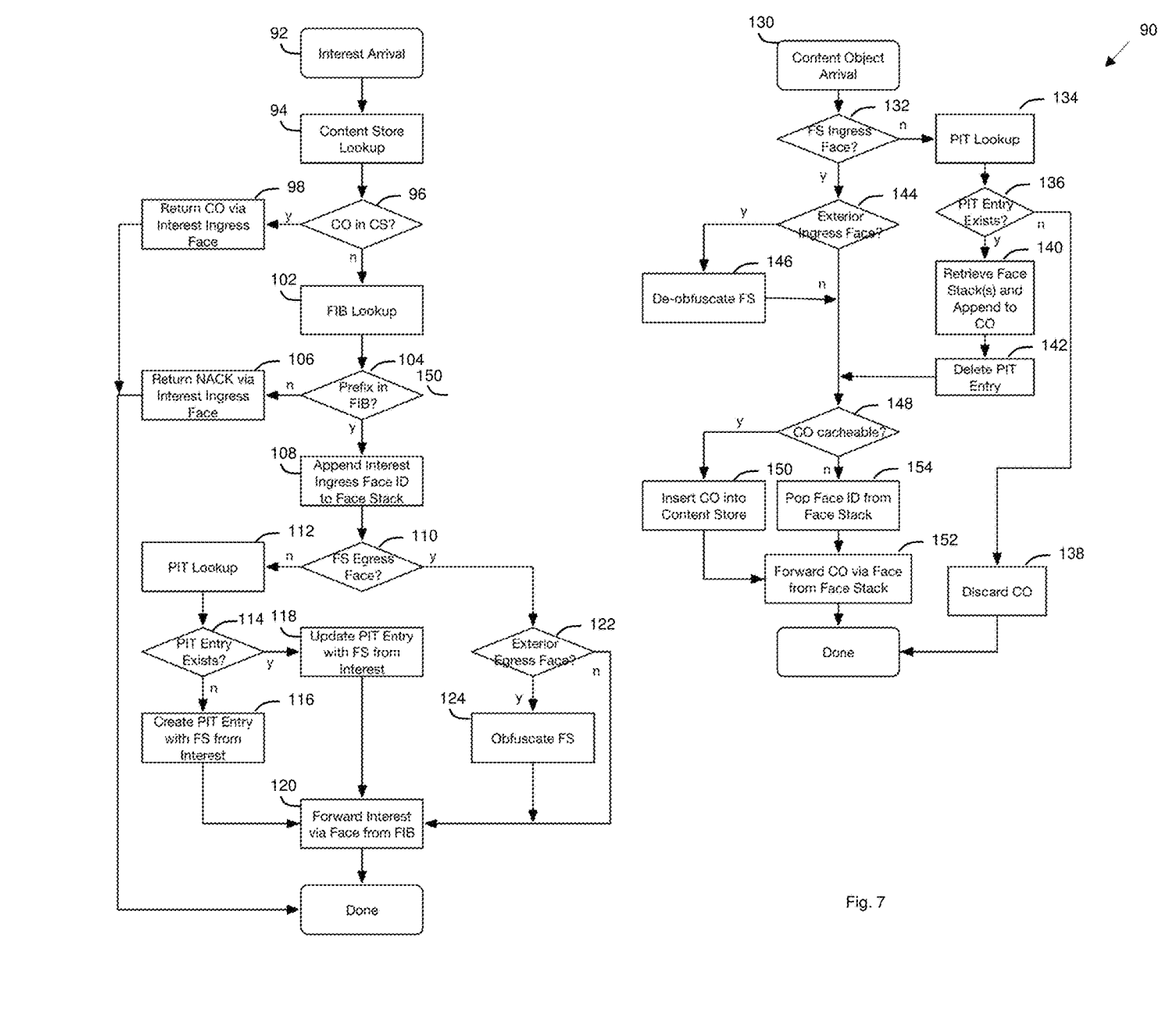
FIG. 7 illustrates a flowchart of a method for forwarding in accordance with one non-limiting aspect of the present invention.

FIG. 7 illustrates a flowchart 90 of a method for forwarding in accordance with one non-limiting aspect of the present invention. The flowchart describes processes associated with operation of a boundary node, i.e., a node operating with a need to forward packets to other nodes outside of the managed network, to nodes incapable of implementing the FS strategy or for other reasons are inoperable with the FS strategy, which may occur in the event the network administrator 24 or other entity associated with the managed network prefers for security, confidentiality or other reasons to prevent exposure of the FS strategy to one or more nodes facilitating the message forwarding. The operations and processes associated with the method may be facilitated with the non-transitory instructions stored within the controller of each node and/or through a remote controller or other device operating independently of the nodes having capabilities sufficient or capable of monitoring and providing the corresponding instructions/commands to the nodes needed to facilitate executing the operations described herein. The flowchart depicts operation of a node when forwarding interests and corresponding operations when forwarding a resulting content object, which may be simultaneously performed at each node and/or according to other processes and operations without deviating from scope contemplation of the present invention.

Block 92 relates to an interest arriving at a border node. Blocks 94-96 relate to the node determining whether its content store (CS) includes and content object (CO) matching that requested in the interest. Block 98 relates to the node responding with a related content object through the face receiving the interest determining when it has a CO matching that requested in the interest. Blocks 102-104 relate to the node determining it lacks a matching CO and performing an assessment of the FIB to determine whether the interest can be forwarded therefrom. Block 106 relates to the node issuing a NACK to the consumer indicating an inability to forward the interest. Block 108 relates to the node appending the face label of the face receiving the interest before determining how to facilitate forwarding it to a next node according to the routing indicated in the FIB. Block 110 relates to the node assessing whether a next node being forwarded the interest supports the FS strategy. The node may determine capabilities of the next node as a function of information provided from that node, the network administrator 24 or through other mechanisms employed to enable nodes to assess characteristics of their neighboring or connected nodes.

Blocks 112-114 relates to the node performing a PIT assessment to determine whether a PIT operating thereon includes an entry for the interest, i.e., whether another interest as was previously received for the same content. Block 116 relates to the node creating an entry in the PIT having the face label, i.e., to designate the face receiving the interest, in the event the node lacked a previous PIT entry. Block 118 relates to the node updating an existing entry and the PIT with the face label to facilitate indicating an additional face the node should utilize when forwarding the resulting content object. Blocks 116-118 may optionally include the node de-appending the face labels previously appended to the face stack field before forwarding the interest to the next node in Block 120. Stripping the face labels from the face stack such that the stack of face labels is stored in a PIT and the name remaining in the interest matches that as originally communicated from the consumer may be necessary in the event the next node is unable to facilitate the FS strategy. Block 122 relates to the node determining a next node to receive the interest having capabilities sufficient to facilitate the contemplated FS strategy, i.e., capabilities sufficient to facilitate adding its own face label to the stack of face labels being appended to the interest. One such scenario may occur when the boundary node is interacting with another network that correspondingly implements the same or a related FS strategy. Block 124 relates to an optional process whereby the border node may obfuscate the face label appended to the interest before its forwarding, such as if the next node is on trusted or unknown.

Block 130 relates to a node receiving a content object having the content matching that identified in the interest. Block 132 relates to the node determining whether the face receiving the content object is associated with a next node having capabilities commensurate with the contemplated FS strategy. Block 134 relates to the next node lacking the FS capabilities, i.e., the face stack field included within the content object lacking stateful information sufficient for the node to determine the face it should use to forward the content object. Block 136 relates to the node checking for an entry in the PIT to see if an interest was previously registered for the content object. Block 138 relates to the node discarding the content object in the event the PIT lacks a corresponding entry. Block 140 relates to the node determining a PIT entry exists having a face stack for the previously generated for the corresponding interest. Block 142 relates to the node deleting the PIT entry from Block 142. Block 144 relates to the node executing operations independently of the PIT when determining the content object to have been received from a next node supporting the FS strategy where an assessment is made to determine whether the content object is received from a node whereupon the face label included therein requires de-obfuscation in Block 146. The need for de-obfuscation may be necessary to reverse or understand the obfuscation performed in 124 to conceal the face labeling. Blocks 148-150 relates to the node determining whether the content object should be cached in its CS before forwarding to a subsequent node. Block 154 relates to the node de-appending or otherwise removing the face label it previously appended to the interest, such as removing the last n bytes included in the face stack field.

As supported above, one non-limiting aspect of the present invention contemplates reducing the memory, memory bandwidth and CPU requirements of network routers that are intended for use within a trusted domain (e.g. enterprise network or ISP network). Within an administrative domain, CCN forwarding can be accomplished with label switching instead of PIT. The attendant Interest Processing may include: CS lookup and FIB lookup. Each Face may have an ID, before forwarding, ingress face ID is appended to the Interest as a label. If the egress face is a link to an untrusted domain (3rd party, interconnection link, peering link, customer domain) then create PIT entry, storing the accumulated label stack. If the egress face is a link to a semi-trusted domain, the label stack could be left intact, but obfuscated, and no PIT entry needed. If the egress face is a link within the trusted domain, simply forward, with no PIT entry created. The attendant Content Object Processing may include: if the ingress face is a link within the trusted domain, pop the final label off the CO and forward out the egress face with the matching ID; if the ingress face is a link to a semi-trusted domain, de-obfuscate the label stack, pop the final label off the CO and forward out the egress face with the matching ID; and if the ingress face is a link to an untrusted domain, do PIT lookup using CO name to recover label stack. pop the final label off the CO and forward out the egress face with the matching ID.

One non-limiting aspect of the present invention contemplates labels being of any size (assume integer number of bytes) optionally as long as each forwarder uses a constant label size. This can be described as an encapsulation layer under CCN, with a header, CCN packet, label stack trailer format. Or it could be a TLV within the CCN packet. Within the trusted domain, flow balance is no longer enforced. This enables applications that for example send an Interest to register themselves with a CCN producer within the domain. That producer can store the label stack for each registered application instance and use that label stack to send unsolicited content objects to that application instance, which could be useful for SDN, network management, etc. Another useful artifact of the label stack is that it uniquely identifies packet flows through the administrative domain. A forwarder will distinguish the use of a face stack frame from a regular ICN frame based on the layer 2 connection type.

Benefits of the present invention may include simpler, higher performance, cheaper core routers and/or routers within the trusted domain, no PIT required. New communication modalities that enables unsolicited communication to consumers within the trusted domain and/or application instance that can send an Interest to "register" itself with a producer. A producer that stores the label stack associated with the application instance and that can then send unsolicited Content Objects to the application by using the label stack. Content pre-positioning can be achieved with better network management. At any location in a network, label stack identifies a consumer for accounting, rate limiting, network protection, etc. while optionally reducing attack surface and preventing Interest flooding attack it can't target a PIT that doesn't exist.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for Content Centric Networking (CCN) forwarding comprising:
  receiving an interest at a node associated with a CCN network;
  appending at the node a face label to the interest;
  forwarding the interest from the node with the appended face label;
  forwarding the interest according to forwarding information stored in a Forwarding Information Base (FIB) on the node, the forwarding information identifying a face of the node to be used in forwarding the interest to a next node, the face label identifying another face of the node other than the face used for forwarding the interest.

2. The method of claim 1 further comprising forwarding the interest from the node without the node correspondingly storing a name included with the interest.

3. The method of claim 1 further comprising:
  determining the node to include a plurality of faces;
  associating each of the plurality of faces with a different one of a plurality of face labels; and
  selecting the face label from the plurality of face labels corresponding with a face of the plurality of faces receiving the interest.

4. The method of claim 3 further comprising forwarding the interest from the node without sharing an association with a next node receiving the interest forwarded from the node, the association relating the plurality faces to the plurality of face labels.

5. The method of claim 1 further comprising:
  prior to forwarding the interest from the node to a next node, performing a trust assessment at the node, the trust assessment determining whether the next node is one of trust and untrusted;
  obfuscating the face label prior to forwarding the interest from the node when the next node is untrusted; and
  forwarding the interest from the node without obfuscating the face label when the next node is trusted.

6. A method for Content Centric Networking (CCN) forwarding comprising:
  receiving an interest at a node associated with a CCN network;
  appending at the node a face label to the interest; and
  forwarding the interest from the node with the appended face label;
  forwarding the interest from the node without the node correspondingly making an entry in a Pending Interest Table (PIT).

7. A method for Content Centric Networking (CCN) forwarding comprising:
  receiving an interest at a node associated with a CCN network;
  appending at the node a face label to the interest;
  forwarding the interest from the node with the appended face label;
  identifying with the face label a face of the node receiving the interest;
  receiving the interest from the node at a next node;
  appending an additional face label to the interest at the next node, the additional face label identifying a face of the next node receiving the interest from the node; and
  without corresponding reliance on the face label or the additional face label, forwarding the interest from the next node such that the interest includes both of the face label and the additional face label.

8. A method for Content Centric Networking (CCN) forwarding comprising:
  receiving an interest at a node associated with a CCN network;
  appending at the node a face label to the interest;
  forwarding the interest from the node with the appended face label receiving a content object at the node in response to the interest, the face label being appended to the content object when received at the node;
  de-appending the face label from the content object;
  forwarding the content object from the node without the face label; and
  forwarding the content object from the node without the node correspondingly deleting an entry in a Pending Interest Table (PIT).

9. The method of claim 8 further comprising:
  determining the node to include a plurality of faces; and
  selecting a face of the plurality of faces for forwarding the content object from the node to be a one of the plurality of faces associated with the face label.

10. The method of claim 8 further comprising:
  determining a next node receiving the content object from the node to be trusted or untrusted;
  de-obfuscating the face label prior to selecting the face when the next node is trusted; and
  selecting the face without de-obfuscating the face label when the next node is untrusted.

11. The method of claim 8 further comprising:
  receiving the content object forwarded from the node at a next node;
  de-appending at the next node an additional face label from the face label; and
  forwarding the content object from the next node without the additional face label.

12. The method of claim 11 further comprising appending the additional face label to the interest at the next node prior to the next node forwarding the interest, the additional face label being different than the face label previously appended to the interest by the node.

13. A method for Content Centric Networking (CCN) forwarding comprising:
  receiving an interest at a node associated with a CCN network;
  appending at the node a face label to a face stack field of the interest, the face label representing a face of the node;
  forwarding the interest from the node to a next node
  receiving a content object at the node in response to the interest, the face label being appended to a face stack field of the content object when received at the node;
  de-appending the face label from the content object; and
  forwarding the content object from each of a first face and a second face of the node without including the face label therewith, the first face and the second face being identified with the face label.

14. A system for Content Centric Networking (CCN) comprising:
  a plurality of interior nodes for exchanging interests and content objects according to face labels included within a face stack field therein; and
  wherein at least one of the interior nodes lack a pending interest table (PIT).

15. The system of claim 14 further comprising one or more boundary nodes for exchange interests and content objects with one or more additional nodes lacking capabilities to exchange interests and content objects using the face stack field, the one or more boundary nodes including a pending interest table (PIT) to statefully store data needed to exchange interest and content objects with the additional nodes.

16. A system for Content Centric Networking (CCN) comprising:
   a plurality of interior nodes for exchanging interests and content objects according to face labels included within a face stack field therein;
   wherein the interior nodes when forwarding interests:
   i) add one of the face labels;
   ii) forward the interests according to forwarding information stored thereat in a Forwarding Information Base (FIB); and
   iii) forward the interests without reliance on the face stack field; and
   wherein the interior nodes when forwarding content objects:
   i) remove one of the face labels;
   ii) and
   iii) forward the content objects according to information in the face stack field when one of the face labels identifies a face of the node forwarding the content object.

* * * * *